Aug. 12, 1969     E. G. G. SPALDING     3,460,208
SLIDING CLASP FASTENERS
Filed June 30, 1966     3 Sheets-Sheet 1
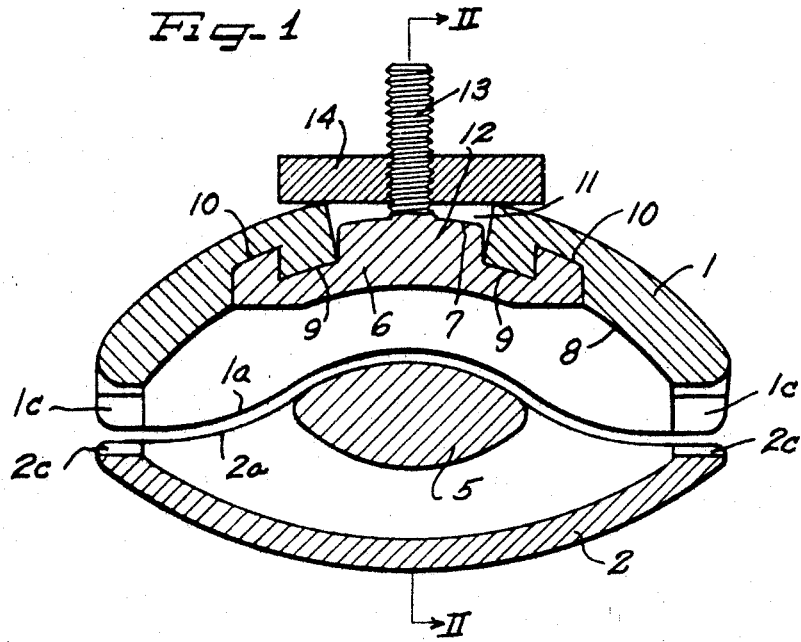
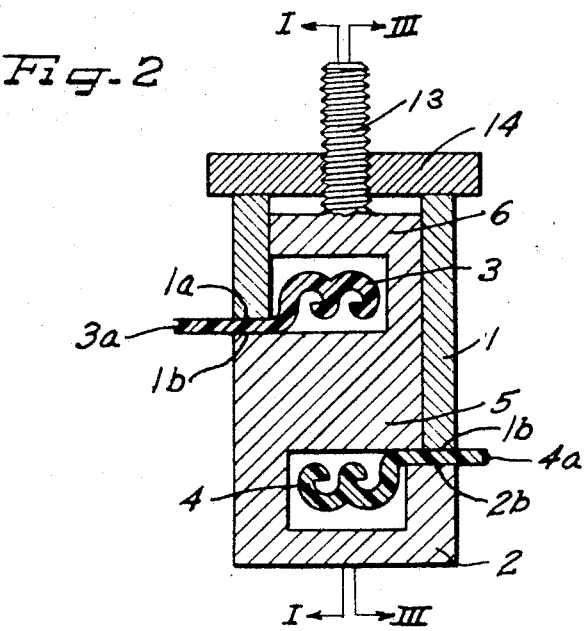
INVENTOR.
Ernest George Gerald Spalding
ATTORNEYS Aug. 12, 1969    E. G. G. SPALDING    3,460,206
SLIDING CLASP FASTENERS
Filed June 30, 1966    3 Sheets-Sheet 2

INVENTOR.
Ernest George Gerald Spalding

ATTORNEYS

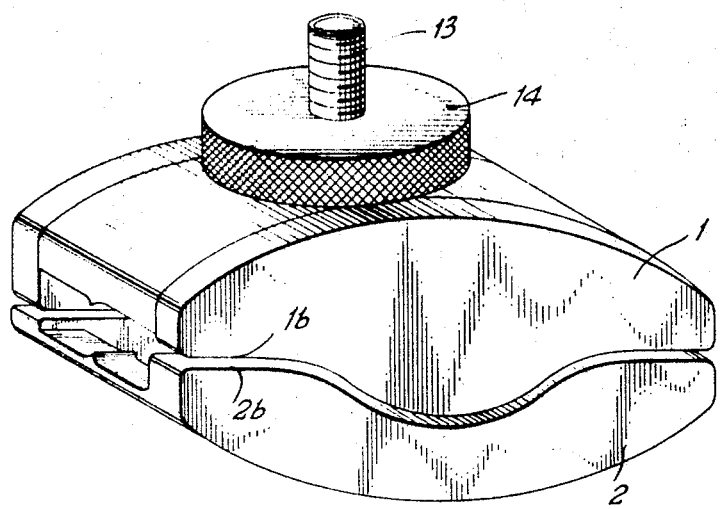

United States Patent Office 3,460,208
Patented Aug. 12, 1969

3,460,208
SLIDING CLASP FASTENERS
Ernest George Gerald Spalding, Welwyn Garden City, England, assignor to Flexigrip, Inc., a corporation of New York
Filed June 30, 1966, Ser. No. 561,822
Int. Cl. A44b 19/16
U.S. Cl. 24—201                                      14 Claims

ABSTRACT OF THE DISCLOSURE

A slider for joining or separating interlocking fastener strips having a body portion and a saddle portion held to the body portion with grooves sealingly receiving the fastener strips. The slider is formed of a first section and a second section with grooves, and the grooves having slots along their length with the sections being relatively movable to adjust the width of the slot. One section is also shiftable in position relative to the other section from a first position where the ends of the groove are the same size to a second position where one end of the groove is smaller.

---

Figure 3:
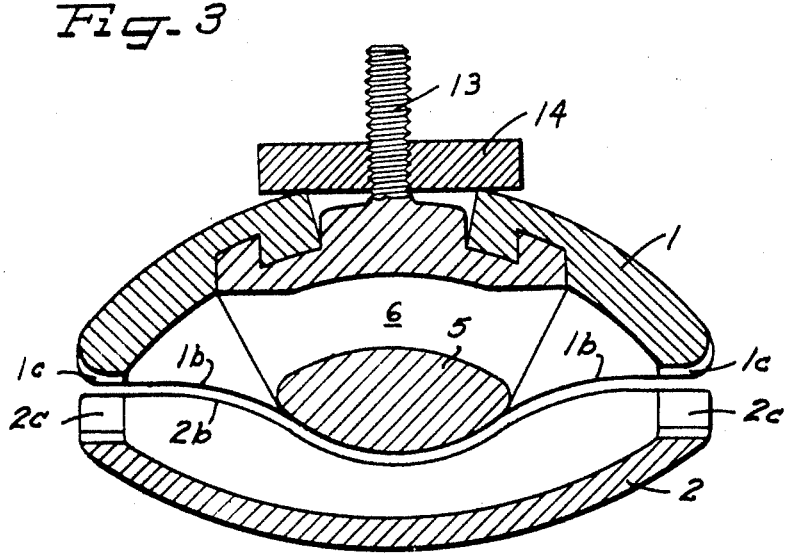

This invention relates to improvements in sliding clasp fasteners, and more especially to a slider or closing tool for a fastener including two mating strips of thermoplastic material.

A well known type of slide fastener comprises two mating strips of thermoplastic material which are shaped to engage one another in a direction at right angles to the plane of the fastener. When the fastener is closed, the two strips are accordingly superimposed one upon the other, and substantial lateral tension on the fastening can be transmitted between the engaging strips without any tendency for the fastener to open. This type of fastener is cheap to manufacture and is generally useful. It has the disadvantage for some purposes, however, that when the fastener is closed, a gap or gaps remain between the strips adjacent the slider between the slider and the closing end of the fastener. The fastener is for this reason not suitable for use when a moisture vapour proof closure is required, although the two strips may provide a moisture vapour proof seal between themselves when in mutual engagement.

The present invention provides a slider for use in a sliding clasp fastener of the type referred to, said slider comprising two relatively longitudinally movable portions arranged to extend on the inner and on the outer side of the fastener opening when the slider is in place therein, and the arrangement being such that, with said two portions in two alternative extreme positions relatively to one another, the slider can either operate in one or the other direction respectively to open or close the fastener; or when the fastener is closed on either side of the slider the two portions can, in a central axis, be moved together to engage the outer faces of the fastener strips in order to enclose that section of the said strips passing between the slider ends and margins together with the adjacent gaps between said strips, so that a substantially moisture vapour proof seal is obtained.

Thus the slider may compirse a main body portion including supporting surfaces for the outer surfaces of both fastener strips within the slider and also including a transverse section for separating the strips in opening the fastener and also including, extending beyond the outer fastener strips, a support section for a separate saddle portion of the slider, the said saddle portion and the main body portion having notched inner surfaces for mutual fixed engagement in at least three different positions longitudinally of the fastener opening, two extreme open positions in which the saddle portion is inclined at an angle with reference to the body portion in order to provide between them at one end a wider entry or exit for the parted strips and at the other end a narrower exit or entry for the mated strips, and a central position in which the saddle portion can be caused to move colser to the plane of the fastener so that the separated strips of the fastener within the slider can be compressed between the surfaces of the saddle portion and the surfaces of the main body portion to seal in the fastener completely, releasable fixing means being provided between the support section and the saddle portion to allow of relative fixing thereof all three positions.

The slider according to the invention has the advantage that it provides a moisture vapour proof closure in combination with a slide fastener of the type referred to.

Figure 4:
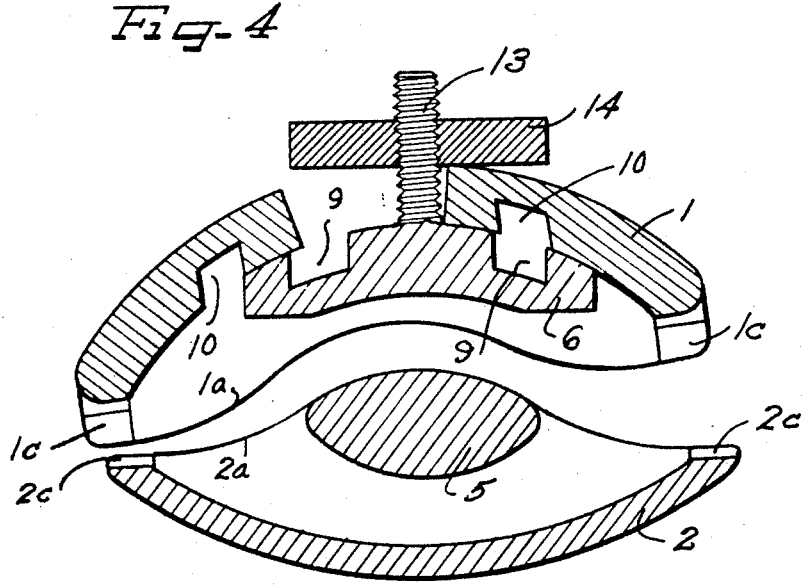

The invention is illustrated by way of example in the accompanying drawings in which:

FIGURE 1 is a sectional elevation of a slider according to the invention along the line I—I in FIGURE 2;
FIGURE 2 is a sectional elevation along the line II—II of FIGURE 1, of the slider together with the cross section of the fastener strips shown in place therein;
FIGURE 3 is a sectional elevation of the slider along the line III—III of FIGURE 2;
FIGURE 4 is a view corresponding to FIGURE 1 showing the parts of the slider in different relative positions; and
FIGURE 5 is a perspective view of the slider.

Referring to the drawings, the slider comprises two flat sided generally boat shaped portions, a main body portion 2 and a saddle portion 1, which extend longitudinally parallel to flexible strips 3 and 4 of a slide fastener, and between which said strips can pass. The portion 2 carries a transverse section 5, integral therewith, which can pass between the margins 3 and 4 as shown in FIGURE 2. Integral with the section 5 is a support section 6 for the portion 1, said support section having an arcuate surface 7, which corresponds in curvature to an arcuate surface 8 of the portion 1. The surfaces 7 and 8 have transverse slots 9 and 10 respectively, by means of which the support section 6 and the portion 1 can engage one another as shown in FIGURES 1 and 3. The portion 1 has an aperture 11 into which a central projection 12 of the support section 6 can penetrate during such engagement, and the projection 12 has a threaded stud 13 carrying a nut 14 by means of which the portion 1 can be clamped into engagement with the support section 6.

The portions 1 and 2 have channels containing side edges 1a, 1b and 2a, 2b respectively, which, when the portions of the slider are in the position shown in FIGURES 1-3, together define paths for web sections 3a, 4a of the strips 3 and 4. The portions 1 and 2 also have, at each end, profiled channels 1c and 2c corresponding to the shape of the outer profiles of the fastener strips, which, when brought together as at the right hand end of FIGURES 1 and 3, form a tight fitting passage for the mated strips.

As shown in FIGURES 1–3, the slider is in the sealing position, and thereby can render the fastener moisture vapour proof when it has been closed as tight as possible, see below. In this position the portions 1 and 2 are clamped together by means of the nut 14 so that the strips 3 and 4 are gripped tightly. The arrangement of the strips 3 and 4 is then such that where they pass between the channels 1c and 2c at each end of the slider, they are fully in tight engagement with each other and the profiled channels 1c and 2c, while within the slider they are separated by the section 5. Since each of the web sections 3a, 4a are tightly held between the edges 1a, 2a and 1b, 2b, a seal is maintained around the gaps between the strips 3 and 4, and, provided that the strips 3 and 4 are in full engagement over the whole length of the fastener outside the slider, a moisture proof closure throughout the fastener is achieved. In order to ensure an efficient closure, the strips 3 and 4 of the fastener are advantageously made of a compressible thermoplastic material, such as polyvinyl chloride, while the slider is made from a harder material such as nylon or metal.

When the slide is to be used for opening or closing the fastener, the saddle portion 1 is moved from the position of FIGURES 1–3 to the required one of two end positions, one of which is shown in FIGURE 4. To move the portion 1 into the position of FIGURE 4, the nut 14 is unscrewed and the portion 1 is lifted until it is out of engagement with the slots 9. The portion 1 can then be slid over the surface 7 of the support 6 until one edge of the central aperture of the portion 1 meets the stud 13 as shown, and can be clamped in this position by re-tightening the nut 14. In the position of FIGURE 4, the slider can operate to open the fastener by moving to the left and to close the fastener by moving to the right. When the slider is moved to the left, mating strips 3 and 4 pass between the left hand channel 1c, 2c, whereupon they are parted by the section 5. When the slider is moved to the right, the separated strips 3 and 4 pass respectively over and under the section 5 and are then urged into engagement by the left hand channels 1c, 2c, which are designed to be at the right distance from each other in order to perform this function. It will be noted that the slider is so designed that when the left hand channels are in a position to lock the strips 3 and 4, the right hand channels are automatically separated so as to leave these strips apart.

The directions of opening and closing movement of the slider can be reversed by moving the portion 1 into the opposite end position to that of FIGURE 4. By suitable changeover, a fastener with end stops may be closed towards the middle, starting from each end stop, so that the slider may be left at any point along the fastening, sealed as described above. This may be of advantage when it is desired to open the fastening for a limited distance, at a particular point, for example for local inspection of the contents of a container closed thereby.

In order to seal the fastener after returning the slider to the central position described above, it is necessary for the strips 3 and 4 to be in mating engagement at both ends of the slider before it is locked. This may be achieved as above described.

The slider could also be adopted for removal from the fastener completely by making the sections 5 separable from the portion 2.

It will be understood that various modifications of the embodiment disclosed herein may be achieved by those versed in the art, but we desire to claim all such modifications as properly come within the scope and spirit of the embodiment disclosed herein.

What is claimed is:

1. A slider comprising:
 a main body portion having first and second fastener grooves formed longitudinally therethrough,
  said fastener grooves being spaced apart at the center of the fastener and being merged at the ends of the fastener,
  said main body portion having a clamping surface formed adjacent each of the fastener grooves,
 a saddle portion engageable with said main body portion and having side walls cooperable with said clamping surfaces for clamping the marginal portions of a flexible strip therebetween,
 means for tightening the saddle portion relative to the main body portion for squeezing a flexible strip between the side walls and the clamping surfaces.

2. A slider in accordance with claim 1 wherein said main body portion comprises a relatively rigid fastener section having the fastener grooves facing outwardly therefrom at opposite sides thereof and having the clamping surfaces formed alongside and extending outwardly of the fastener grooves.

3. A slider in accordance with claim 2 wherein the side walls of the saddle portion extend over and seal off the fastener grooves when a flexible strip is operably disposed within the grooves.

4. A slider comprising:
 a main body portion having an arcuate fastener groove formed within opposite sides thereof,
  said arcuate fastener grooves being spaced apart at the longitudinal center of the main body portion and being joined at the longitudinal ends thereof,
 a saddle portion receivable over the main body portion having side walls overlying the arcuate fastener grooves,
  said saddle portion and said main body portion together having surface means for sealably engaging the marginal portions of flexible fastener elements disposed within said fastener grooves, and
 means for tightening the saddle portion to the main body portion and for compressing flexible fastener elements between the surface means and for loosening the saddle portion from the main body portion, whereby said surface means may be disengaged and the fastener may be slidingly moved along the length of a flexible fastener disposed in the fastener grooves.

5. A slider in accordance with claim 4 wherein said main body portion has a central support section and wherein said means for tightening the saddle portion to the main body portion is disposed centrally of the support section,
 said support section having transverse slots formed at opposite sides of the means for tightening the saddle portion to the main body, and said saddle portion having ribs for interlocking within the transverse slots, and said means for tightening the saddle portion to the main body engaging the ribs of the saddle portion and compressing the ribs within the transverse slots of the main body portion.

6. A slider in accordance with claim 5 wherein said means for tightening the saddle portion to the main body comprises a threaded stud extending from the support section and through the saddle portion between the ribs thereof, and a nut threadedly received on the stud and overlying the ribs of the saddle portion whereby tightening the nut compresses the ribs within the transverse grooves of the support section.

7. The combination comprising:
 a flexible fastener having first and second interlocking elements,
 each of said first and second interlocking elements having a web section affixed thereto,
 a slider having a main body portion and a saddle portion,
 the main body portion having first and second fastener grooves formed substantially longitudinally therethrough,
 said grooves tapering in shape for joinging the interlocking elements,
 said first fastener groove having a slot opening to the outside of the slider on one side of the main body portion and receiving the first interlocking element longitudinally therein with the associated web section extending outwardly therefrom,
 said second fastener grooves having a slot opening to the outside of the slider at the opposition side of the main body portion and receiving the second interlocking element longitudinally therein with the associated web section extending outwardly therefrom,
 said saddle portion having side sections at opposite sides of the body portion thereof and sealably engaging the web sections of the first and second interlocking elements against the main body portion, and
 means for moving said side sections across the openings of said slots, whereby regardless of the position of the slider a continuous seal is effected along the length of the flexible fastener.

8. The combination in accordance with claim 7 wherein the interlocking elements are disengaged centrally within the slider and engaged at the longitudinal ends of the fastener grooves within the slider and outside the slider.

9. The combination in accordance with claim 7 wherein a divider is provided within the slider and wherein the fastener grooves extend around opposite sides of the divider and merge at opposite ends of the slider whereby the interlocking elements will be spaced apart in the vicinity of the divider and interlocked at the ends of the fastener grooves as well as sealably engaged along the length of the marginal portions between ends of the fastener grooves.

10. The combination in accordance with claim 9 wherein a support section of the main body portion is hooked to the saddle portion and wherein a clamp means is provided for tightening the saddle portion to the support section and for increasing the sealable engagement of the saddle portion against the marginal portions of the fastener elements.

11. The combination in accordance with claim 10 wherein the saddle portion is hooked to the support section at opposite longitudinal sides of the clamp means and wherein either longitudinal end of the saddle portion may be unhooked from the support section and positioned outwardly therefrom, thereby widening the gap at the adjacent longitudinal end of the fastener grooves and allowing the clasp fastener to be freely slidable along the length of the interlocking elements for locking or unlocking the elements depending upon the longitudinal direction of movement thereof.

12. A slider fastener comprising:
a fastener housing,
first and second fastener grooves formed longitudinally through the housing,
said grooves having slots respectively along their lengths at opposite sides of the fastening housing, said slots opening from the grooves to the outside of the slider,
said grooves being tapered within the fastening housing and being separated at the center thereof and being merged at least at one of the longitudinal ends of the housing, and
means for adjusting the width of the slots and thereby sealably securing a flexible fastener disposed within the fastener grooves.

13. A slider comprising:
a fastener housing having first and second sections,
first and second fastener grooves formed longitudinally through the housing for receiving interlocking elements of fastener strips and merging at first and second ends of the slider and being defined between said first and second sections,
means between said grooves between the slider ends for separating the fastener strips,
means mounting said second section on said first,
said second section movable on said first section from a first position wherein said grooves at said first and second ends of the slider are of a depth for joining the fastener strip,
and a second position wherein the groove at said first end of the slider is of a depth to join the fastener elements and of a greater depth at the second end so as to permit the fastener elements to remain separated.

14. A slider in accordance with claim 13 wherein one of said sections has notches receiving projections on the other section in said first position and the projections are out of the notches in said second position.

References Cited

UNITED STATES PATENTS

| | | |
|---|---|---|
| 1,585,645 | 5/1926 | Binns. |
| 2,366,797 | 1/1945 | Legat. |
| 2,665,467 | 1/1954 | Bosomworth. |
| 3,181,300 | 5/1965 | Plummer _____ 24—205.15 X |
| 2,351,803 | 6/1944 | Best _____ 24—205.15 X |
| 2,508,147 | 5/1950 | Dutch _____ 24—205 X |

FOREIGN PATENTS

| | | |
|---|---|---|
| 502,135 | 4/1951 | Belgium. |
| 586,868 | 10/1933 | Germany. |
| 312,621 | | Great Britain. |

BERNARD A. GELAK, Primary Examiner

U.S. Cl. X.R.

24—205